United States Patent [19]

Sindelar

[11] Patent Number: 4,472,157
[45] Date of Patent: Sep. 18, 1984

[54] HOMOKINETIC UNIVERSAL JOINT

[76] Inventor: William F. Sindelar, 8009 York Rd., Towson, Md. 21204

[21] Appl. No.: 484,316

[22] Filed: Apr. 12, 1983

[51] Int. Cl.³ .............................. F16D 3/20; F16D 3/30
[52] U.S. Cl. .................................... 464/124; 464/113; 464/117; 464/136; 464/905
[58] Field of Search ............................... 464/112–124, 464/134, 135, 136, 905

[56] References Cited

U.S. PATENT DOCUMENTS

| | | | |
|---|---|---|---|
| 1,071,377 | 8/1913 | Wilkinson | 464/135 |
| 2,051,248 | 8/1936 | Dunn | 464/121 |
| 2,341,084 | 2/1944 | Dodge | 464/122 |
| 2,672,739 | 3/1954 | Wildhaber | 464/120 |
| 2,672,740 | 3/1954 | Dunn | 464/136 |
| 2,685,784 | 8/1954 | Wildhaber | 464/116 |
| 2,752,765 | 7/1956 | Wildhaber | 464/123 X |
| 2,917,911 | 12/1959 | Wildhaber | 464/123 |
| 3,975,922 | 8/1976 | Orain | 464/123 |
| 4,178,778 | 12/1979 | Orain | 464/113 X |
| 4,379,706 | 4/1983 | Otsuka | 464/124 X |

Primary Examiner—Stuart S. Levy
Assistant Examiner—Thomas R. Hannon

[57] ABSTRACT

A Pot-type universal joint transmits torque from one shaft to another using four rollers mounted on four trunnions. The trunnions maintain their mutual perpendicularity under all operating conditions. They are free to move relatively to each other and to the shaft to which they are joined but in a way that satisfies the kinematic requirements set forth in the specification, while providing a torsionally rigid connection between the shafts. The transmission of torque is homokinetic. The joint is adaptable for either axially fixed or axially displaceable requirements.

10 Claims, 21 Drawing Figures

HOMOKINETIC UNIVERSAL JOINT

TECHNICAL FIELD

This invention is in the general field of shaft couplings. Specifically, it pertains to homokinetic universal joints such as those classified according to function in U.S. Patent Class 464-905.

BACKGROUND ART

Universal joints that transmit torque from one shaft to another by way of rollers rotating on trunnions that are fixed radially to one shaft, while simultaneously rolling inside of grooves carried by the other shaft are old in the art. They are often referred to as Pot-type joints because of the pot-like appearance of the part in which the rollers and trunnions are contained.

Two types are in commercial use. One uses two diametrically opposed trunnions fixed to one shaft and is non-homokinetic in operation at an angle. The other uses three equally spaced radial trunnions fixed to one shaft and is quasi-homokinetic when operating at an angle, i.e. the output rotation is orbital in nature and not pure rotation. Allowance must be made for this characteristic in any practical applications and for some the joint cannot be used.

Four trunnions can be readily accommodated within the circular cross-sectional area occupied by either of the above types of universal joints, thereby increasing torque capacity considerably with no diametral size penalty. This fact has long been recognized, and a sizeable collection of Prior Art exists featuring four trunnion pot-type joints with near-homokinetic torque transmission. The designs are based on the following concept:

The four trunnions and rollers on one shaft and their mating grooves on the other shaft are, in effect, divided into two universal joints of the two-trunnion type noted above. They are circumferentially spaced at right angles to each other and cooperate in such manner as to average the non-homokinetic rotation of each. The resulting rotation of the output shaft is still non-homokinetic, but of smaller magnitude than that of each two-trunnion joint taken separately.

Some illustrative examples follow:

Orain U.S. Pat. No. 3,975,922 uses torsionally resilient means to connect the two-trunnion joints to the output shaft. The resultant output rotation is an average of two non-homokinetic rotations ninety degrees out of phase.

Wildhaber U.S. Pat. No. 2,672,739 also uses resilient means but in compression between the trunnions to act as an "equalizer".

Anderson U.S. Pat. No. 2,672,740 employs equalizing levers to achieve a similar result.

As the art shows, the concept does not lend itself to a simple reliable design. This is probably the reason why no commercial applications are known.

A totally different concept, believed to be new in the art, is the basis of this invention. It does not unduly restrict design freedom in the choice of proven practical structure that is both compact and strong. Operationally, it ensures dynamic balance coupled with true homokinetic transmission of torque.

DISCLOSURE OF INVENTION

The invention is a Pot-type homokinetic universal joint using rollers mounted on four mutually perpendicular radial trunnions.

The essence of the invention lies in the manner in which the trunnions are allowed to move relative to each other during joint operation at an angle, while maintaining a torsionally rigid connection between the two joint halves.

Specifically, the trunnions are so connected to one joint half that relative movement between the trunnion axes is possible but subject to the following conditions:
1. The trunnion axes remain coplanar.
2. Mutual perpendicularity of trunnion axes is continuously maintained.
3. One vertex formed by the intersection of any two adjacent trunnion axes can move radially toward or away from the axis of rotation of the joint half to which the trunnions are connected.
4. The other vertex formed by the remaining two adjacent axes can move in an identical mirror-image manner.
5. Both vertices are constrained to move in a bisector plane that always bisects the ninety degree vertex angle of the adjacent trunnion axes.
6. The bisector plane passes through the axis of rotation of the joint half to which the trunnions are connected.
7. The axis of rotation of the joint half remains perpendicular to the trunnion plane.

The kinematic requirements outlined above ensure true homokinetic or constant velocity transmission of torque at any angle of operation. They are derived from a geometrical construction discovered by applicant which, to the best of his knowledge, has not been known or exploited in Prior Art.

The invention fulfills these design objectives:
1. True homokinetic operation at all angles
2. Rotational dynamic balance
3. Low friction operation
4. Radially self-supporting
5. Axial displacement capability
6. Axial fixing capability
7. High torque capacity to diametral size ratio
8. Robust construction

BEST MODE FOR CARRYING OUT THE INVENTION

Foreword

In the description and claims to follow, reference will be made to geometric planes, axes, centerline paths, etc. These are not physical entities, but they are in all cases defined by the physical structure with which they are associated. They can be dimensionally determined with great precision by well known metrological methods. Such abstractions are indispensable frames of reference for manufacturing purposes and are universally considered to be part of structure. It is in this context that the description and claims be interpreted.

The term "self-supporting" is used and as applied to a universal joint means that no external means are required to maintain the two joint halves in proper operating relationship, i.e. the point of articulation is determined and maintained by the interaction of the internal torque transmitting members.

Figure 1:
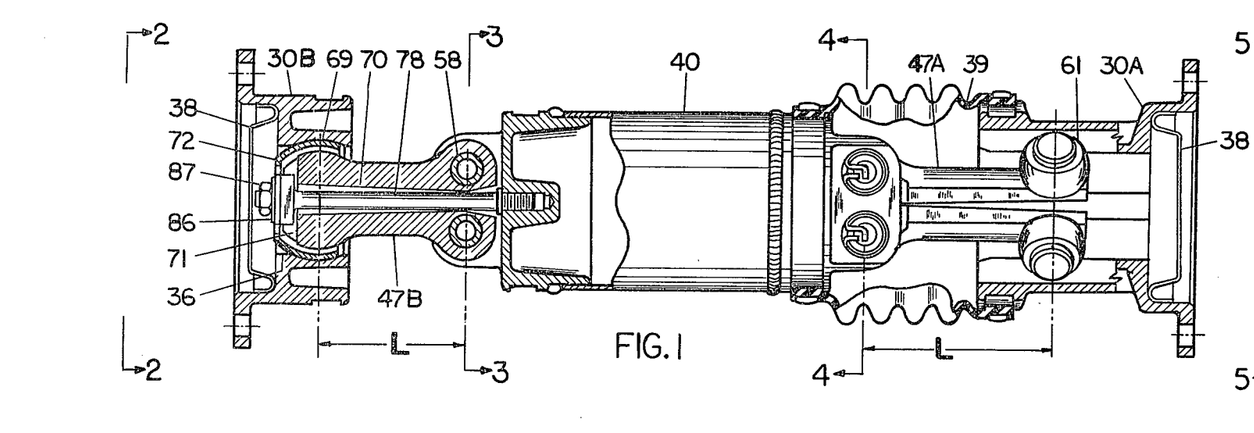
FIG. 1 is a part sectional view in orthographic projection of a driveshaft embodying the invention. An axially displaceable variation is shown at the right and an axially fixed variation is shown at the left.
Figure 2:
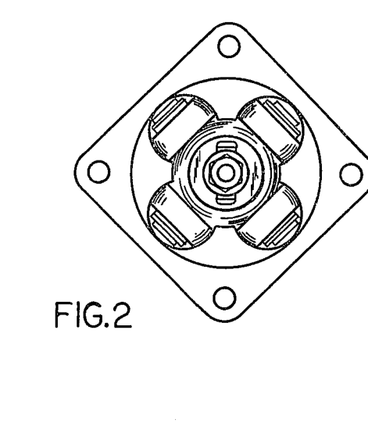
FIG. 2 is an end view in the direction of arrows 2—2 shown in FIG. 1 with end closure removed.

Three variations of the basic invention are illustrated in the drawings:

Embodiment A shown in FIGS. 1 (R.H. end), 4, 5, 6 is axially displaceable and self-supporting.

Embodiment B shown in FIGS. 1 (L.H. end), 2, 3, 7 is axially fixed and self-supporting.

Figure 13:
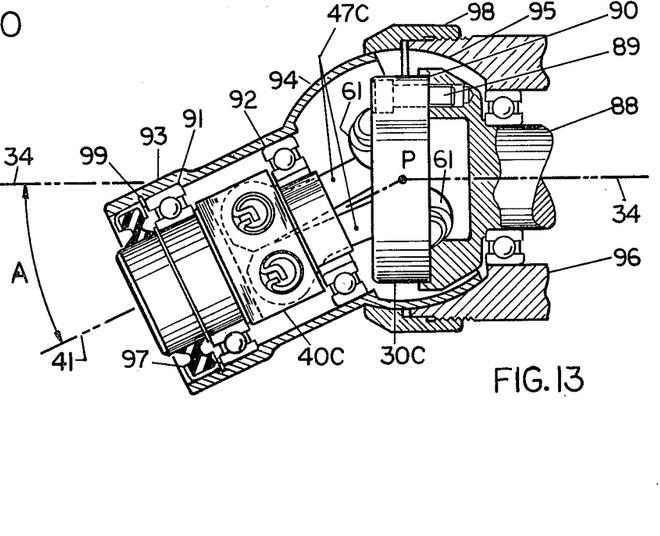
FIG. 13 is a sectional view in orthographic projection showing the invention in an axially fixed variation using external ball and socket construction.

Embodiment C shown in FIG. 13 is axially fixed and is not self-supporting.

Embodiment A is basic and will be described in full detail. Embodiment B and C differ from Embodiment A in that some structure is added and some modified. The modified structure is identified in the drawings and description for all three embodiments by labeling it with the same numeral followed by an A, B, or C as applicable.

To avoid repetitious recitation of common structure, only the modified and added structure will be described for Embodiments B and C.

Finally, the geometric principle underlying the invention and its operation will be described with reference to FIGS. 10 through 21.

DESCRIPTION OF EMBODIMENT A

First Joint Half 30A

Figure 6:
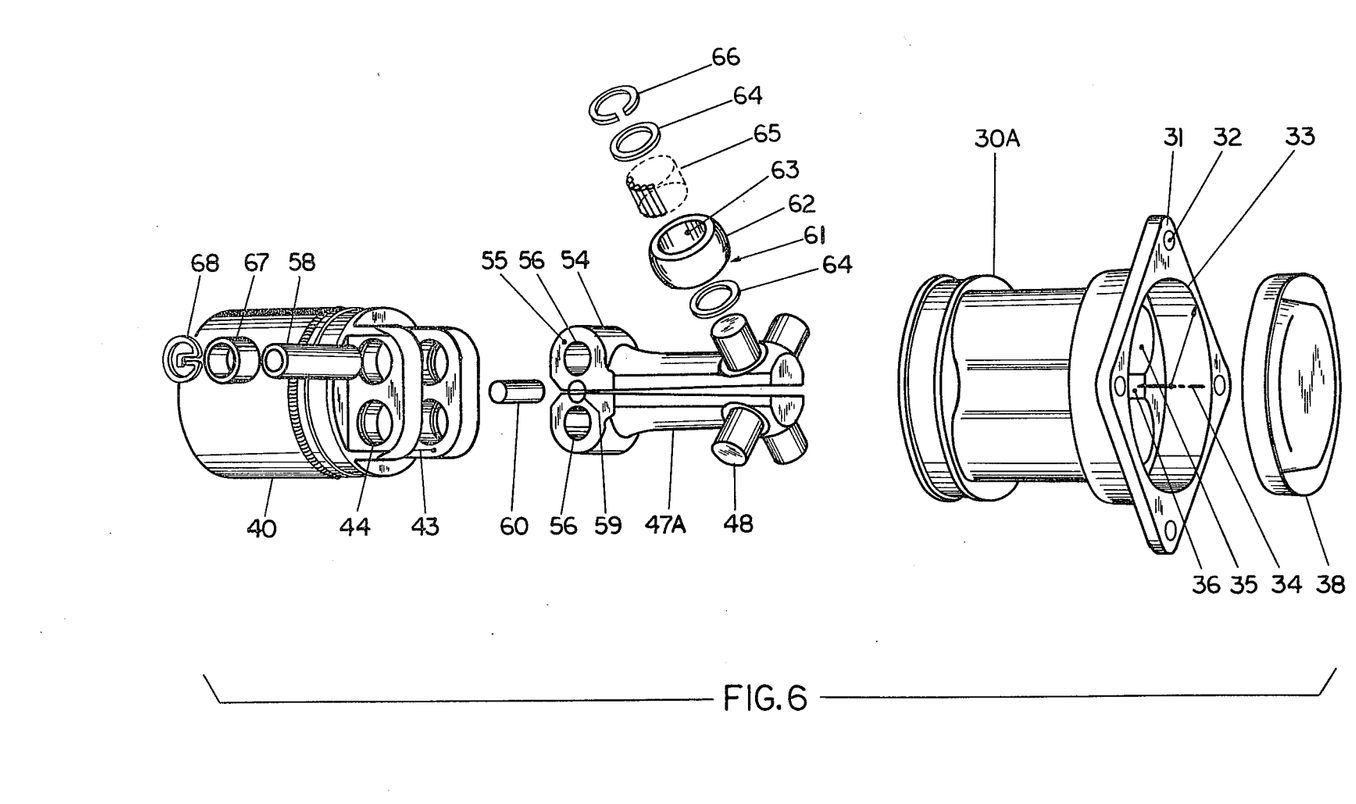
FIG. 6 is an exploded perspective view of the right hand end of FIG. 1.
Figure 12:
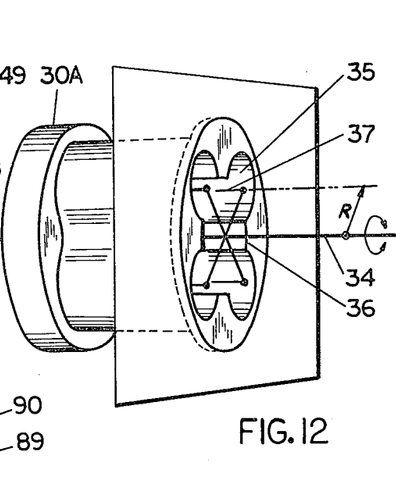
FIG. 12 is a perspective view of part of the invention known as the first joint half shown cut by a plane perpendicular to the axis of rotation to better illustrate the four grooves and their centerline paths.

FIGS. 6, 12

A hollow cylindrical member 30A has at one end a flange 31, fastener holes 32, and a pilot hole 33 having a centerline 34. This centerline becomes the axis of rotation for the first joint half 30A when it is mounted by means of the pilot hole, flange face, and fastener holes to a suitable rotating power source not shown. Four axially extending grooves 35 of circular cross section are formed in the inside surface 36 of member 30A. Each groove defines a centerline roller path 37 (FIG. 12). The grooves are equally spaced circumferentially, with the centerline paths 37 held parallel to the axis of rotation 34 and located radially from it a distance R.

An end closure 38 (FIG. 6) is press fitted into pilot hole 33. It serves to retain lubricant and exclude dirt in cooperation with boot 39 (FIG. 1).

Second Joint Half 40

FIGS. 1, 4, 6, 10

A cylindrical member 40 (FIG. 10) has an axis of rotation 41 contained in a reference plane 42. At one end of the member, a groove 43 is formed parallel with and central to plane 42 to form a fork-like configuration with two projecting bearing supports. Two in-line bearing holes 44 are bored through both bearing supports. Each in-line bore has a bearing axis of rotation 45 and both axes lie in a common plane 46 which is perpendicular to plane 42. The bearing axes are parallel to each other and located at equal radial distances from the axis of rotation 41.

Trunnion Carrier 47A

Figure 11:
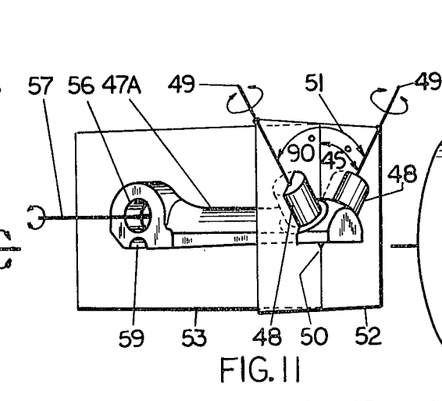
FIG. 11 is a perspective view of part of the invention known as the trunnion carrier, illustrating pertinent geometric planes and axes.

FIGS. 1, 6, 11

An elongated half cylindrical member 47A (FIG. 11) carries at one end, two perpendicular trunnions 48 defining straight line axes 49. These axes meet at a vertex 50 and form a vertex angle 51. They lie in a trunnion plane 52. A bisector plane 53 bisects the vertex angle 51 and is perpendicular to the trunnion plane 52.

The other end (FIG. 6) carries a boss 54 with parallel sides 55. The sides are also parallel with and symmetrical about bisector plane 53 (FIG. 11). A pivot shaft hole 56 having a pivot axis of rotation 57 is bored through boss 54 and is a press fit for pivot pin 58 (FIG. 6). The pivot axis 57 is located at a distance L (FIG. 1) from trunnion plane 52, parallel to it, and perpendicular to bisector plane 53.

A half cylindrical groove 59 extends across the bottom face of the trunnion carrier and is parallel to hole 56. It is a close fit with connector pin 60 (FIG. 6).

Rollers 61

Figure 5:
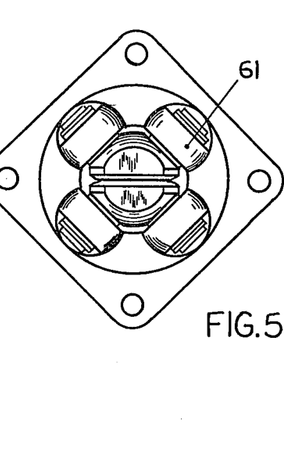
FIG. 5 is an end view in the direction of arrows 5—5 shown in FIG. 1 with end closure removed.
Figure 7:
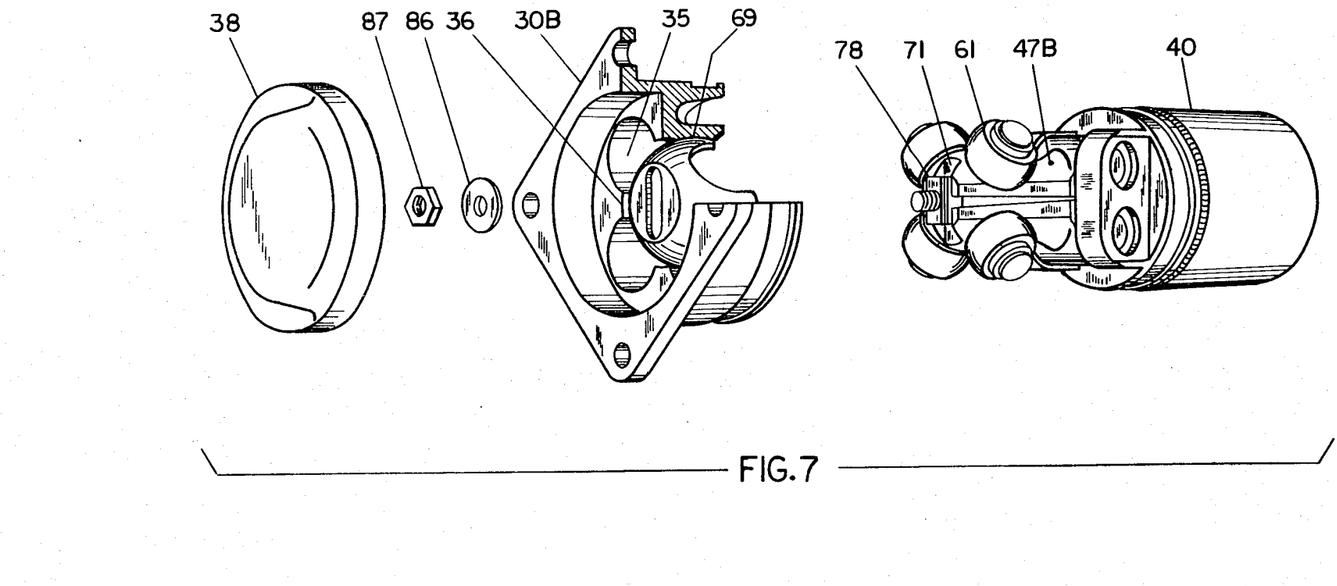
FIG. 7 is a perspective view of the left hand end of FIG. 1 in partial disassembled condition.

FIGS. 5, 6, 7

Four part spherical rollers 61 have an outer spherical surface 62 (FIG. 6) and a cylindrical bore 63. The rollers are mounted on trunnions 48 by means of washers 64, needle rollers 65 and retaining ring 66. The rollers are free to rotate about and slide axially along the trunnions, while rolling and oscillating in the first joint half grooves.

Assembly Of Embodiment A

Figure 4:
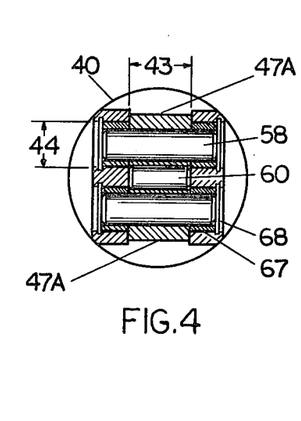
FIG. 4 is a sectional view indicated by arrows 4—4 shown in FIG. 1.

FIGS. 1, 4, 6

Connector pin 60 (FIGS. 4, 6) is placed between the two trunnion carriers 47A. The trunnion bosses 54 are then placed into the groove 43 in the second joint half 40. Two pivot pins 58 are inserted through holes 44 and press fitted into the trunnion carrier hole 56. Four bushings 67 and four retaining rings 68 are then assembled into holes 44. The four rollers 61 are mounted on the trunnions in the manner already described to complete a subassembly of the second joint half and two trunnion carriers.

At this point, it is apparent that this subassembly results in a rigid torque transmitting connection from the rollers 61 to the second joint half 40, while allowing relative movement of the trunnions in a radial direction. Because connector pin 60 contacts both trunnion carriers, the pivoting action of one carrier is accompanied by an equal, opposite and simultaneous pivot action of the other carrier. Thus the two vertices 50, one on each carrier, (FIG. 11) move in the bisector plane 53 in mirror-image fashion. The importance of this is discussed under OPERATING PRINCIPLE.

To complete the final assembly of Embodiment A, the boot 39 (FIG. 1) is clamped to the second joint half and trunnion assembly, lubricant added and the subassembly slipped into the first joint half clamping boot 39 thereto.

The result is a universal joint that is self-supporting and capable of axial movement while transmitting torque at constant velocity.

DESCRIPTION OF EMBODIMENT B

The description of Embodiment A applies. The following describes the added modifications and structure.

First Joint Half 30B

FIGS. 1 (L.H. end), 7

The first joint half 30B is shorter in axial length than 30A because it is not necessary to accommodate axial displacement. A concave spherical surface 69 (FIGS. 1, 7) is formed in the inside surface 36 of the joint half.

Trunnion Carrier 47B

Figure 3:
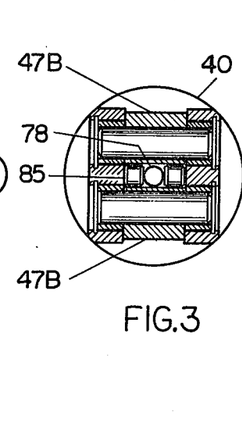
FIG. 3 is a sectional view indicated by arrows 3—3 shown in FIG. 1.

FIGS. 1 (L.H. end), 3, 7

The trunnion carrier 47B (FIG. 1) is relieved on its underside by a groove 70. A keyway 71 (FIGS. 1, 7) is cut into the front face central with the bisector plane that is shown in FIG. 11. The length L (FIG. 1) can be made shorter than that for Embodiment A.

Spherical Shell 72

Figure 8:
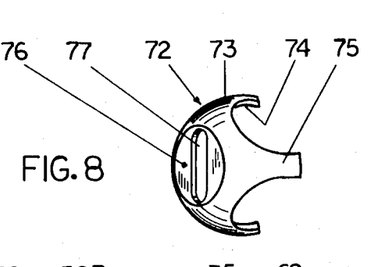
FIG. 8 is a perspective view of the spherical shell shown in FIG. 7 and FIG. 1 (L.H. end).

FIGS. 1 (L.H. end), 7, 8

A part spherical thin-walled shell 72 with a convex spherical surface 73 and an inner concave spherical surface 74, has four cut-out regions to clear rollers 61 leaving four projections 75. The shell has an end surface 76 with an elongated key slot 77 cut therein. The concave surface 74 is dimensioned so that sufficient clearance exists for the trunnion carriers at their extreme outward positions.

T-Bolt 78

Figure 9:
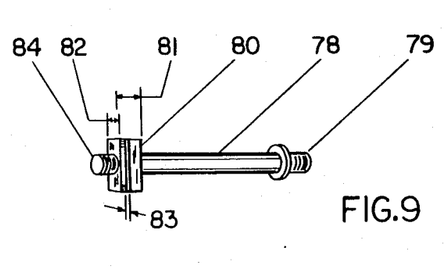
FIG. 9 is a perspective view of the T-bolt shown in FIG. 7 and FIG. 1 (L.H. end).
Figure 10:
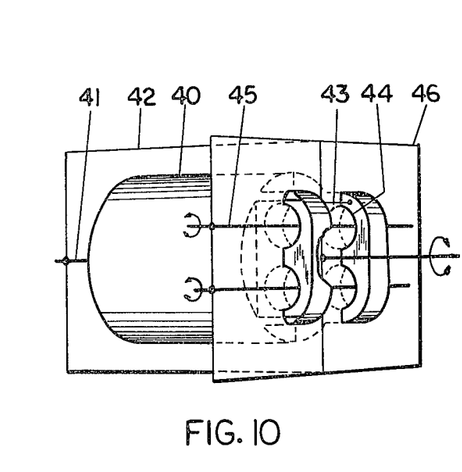
FIG. 10 is a perspective view of part of the invention known as the second joint half, illustrating pertinent geometric planes and axes.

FIGS. 1 (L.H. end), 7, 9

A T-shaped bolt 78 (FIG. 9) has a threaded end 79. A rectangular head 80 at the opposite end forms a double-width key, one width is labeled 81 and the other is labeled 82. Width 81 is greater than width 82 making two ledges 83 against which the spherical shell 72 is later clamped. Another threaded end 84 is adjacent to the head 80.

Assembly Of Embodiment B

FIGS. 1, 2, 3, 7

Embodiment B is assembled in the same manner as Embodiment A except that T-bolt 78 is screwed into the second joint half 40 (FIG. 1 L.H.) before the trunnion carriers are assembled. Also, two short connector pins 85 (FIG. 3) are placed between the trunnion carriers straddling the T-bolt instead of one long pin 60 as in Embodiment A. The carriers are then swung into position over the T-bolt so that width 81 on the T-bolt mates with keyway 71 on the carriers.

The spherical shell 72 is assembled into the first joint half 30B (FIG. 7) by aligning projections 75 with the grooves 35 and then positioning the shell axially so that its spherical surface 73 aligns with spherical surface 69 in the first joint half. An approximate one-eight turn of the shell then mates it with the first joint half.

The second joint half and trunnion carrier subassembly is then slipped into the first joint half, mating width 82 on the T-bolt with the elongated keyslot 77 in the shell 72. Washer 86 and nut 87 are placed in position over threaded end 84 and tightened to clamp the spherical shell against the ledges 83 on the T-bolt. Lubricant and fastening of the boot as in Embodiment A completes the assembly.

The result is a universal joint that is self-supporting and axially fixed to articulate about a fixed point P in the axes of rotation. Note that axial forces only are carried by the shell and T-bolt.

DESCRIPTION OF EMBODIMENT C

The description of Embodiment A applies. The following describes the added modifications and structure.

First Joint Half 30C

FIG. 13

The first joint half 30C has the form of a short hollow cylinder. It is fastened to a rotating power source 88 in a manner similar to Embodiment A with screws 89 and a pilot diameter 90.

Second Joint Half 40C

FIG. 13

The second joint half 40C is adapted for rotation and axial fixing by bearings 91 and 92 which are held in a housing 93.

Trunnion Carrier 47C

FIG. 13

The trunnion carrier 47C can have a shorter length L (FIG. 1) than Embodiment A. Also, groove 59 (FIG. 6) is eliminated because connector pin 60 is not used. The reason is explained under OPERATING PRINCIPLE.

Swivel Housing 93
FIG. 13

The housing 93 has a convex spherical surface 94 which mates with a concave spherical surface 95 in a stationary housing 96. An inside bore provides support for seal 97 and bearings 91 and 92.

Stationary Housing 96
FIG. 13

This housing is stationary and supports rotating power source 88. A concave spherical surface 95 is formed in an inside surface and threaded means are shown on an outside surface to engage a retaining ring 98.

The ball and socket design shown consisting of swivel housing 93, stationary housing 96 and retaining ring 98 is one of many variations that are well known and can be used in connection with this invention.

Assembly Of Embodiment C
FIG. 13

The first joint half 30C is mounted to power source 88 in the manner already noted. The two trunnion carriers 47C with rollers 61 in place are first inserted through the bore of bearing 92, then assembled into the second joint half 40C in the same way as Embodiment A. Bearing 92 is then placed into position on the second joint half and the other bearing 91 is likewise positioned. This makes up a second joint half and trunnion carrier subassembly which is then inserted into the inside bore of swivel housing 93 and fixed into position by snap ring 99. Seal 97 is pressed into place. Lubricant is added and the swivel housing 93 with its contents is joined to stationary housing 96 by means of the spherical surfaces 94 and 95. The retaining ring 98 is assembled to complete the final assembly.

The result is a universal joint that is not self-supporting and requires external means for rotational support and axial fixing for articulation about a fixed point P.

OPERATING PRINCIPLE

Figures 14, 15, 16, 17:
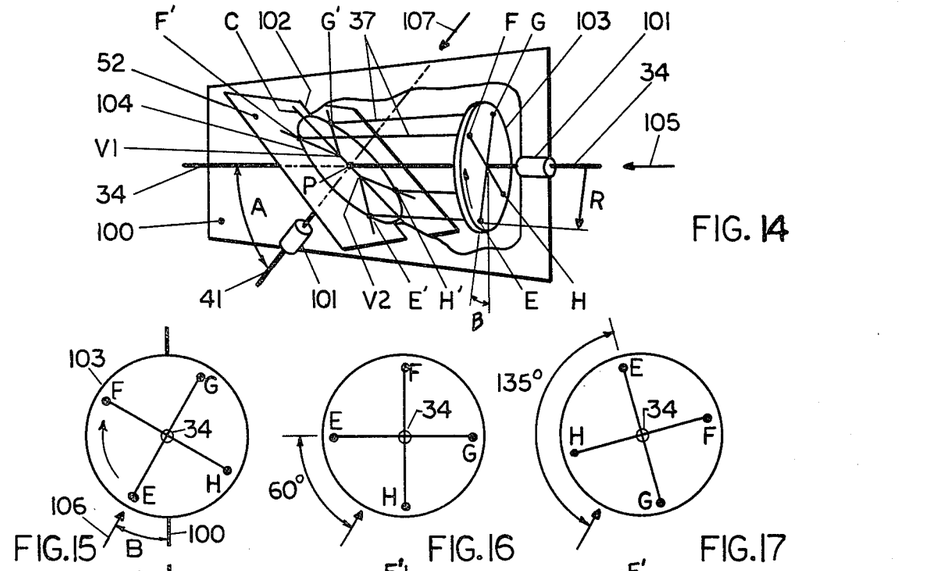
FIG. 14 is a perspective schematic diagram of FIG. 13 illustrating pertinent geometric planes and axes and their kinematic relationship.
FIGS. 15, 16, 17 are orthographic projections in the direction of arrow 105 shown in FIG. 14 with axis 34 rotated to different angular positions.

Refer to FIG. 14. This is a perspective schematic diagram of Embodiment C which is shown in FIG. 13.

A plane 100 contains both the first axis of rotation 34 and the second axis of rotation 41. Two bearings for the axes are schematically shown fixed to the plane and are labeled 101. The axes are inclined to each other at an angle A, known as the true joint angle, and intersect at point P. Trunnion plane 52 passes through this point and is perpendicular to the second axis of rotation 41. The line of intersection of the two planes is labeled 102.

A disc 103 is shown perpendicular to the first axis of rotation 34 and carries four axially extending lines 37 which represent the centerline roller paths 37 already described. These lines are parallel to the axis of rotation 34 and located at a radial distance R from it. Disc, lines and axis represent schematically the first joint half 30C shown in FIG. 13.

The four lines 37 intersect the disc 103 at points E, F, G, H. They also intersect the trunnion plane 52 at points E', F', G', H'. These four points lying in the trunnion plane schematically represent the four rollers 61.

If disc 103 is rotated in bearing 101 carrying along lines 37, their points of intersection E', F', G', H' with the trunnion plane 52 will plot an ellipse 104. The disc 103 is shown in an arbitrary start position indicated by angle B, which is measured between the plane 100 and a radial line drawn from point E to the axis of rotation 34.

Figure 21:
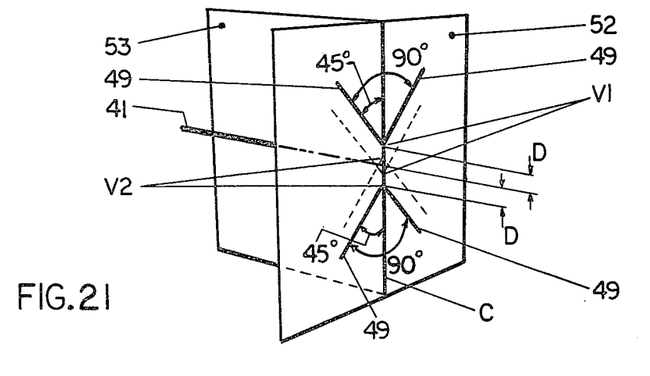
FIG. 21 is a perspective schematic diagram of parts of the invention known as the second joint half and the trunnion carriers connected together and showing pertinent geometric planes and axes and their kinematic relationship.

Refer to FIG. 21. This is a perspective schematic diagram of the subassembly of the second joint half 40C and the trunnion carriers 47C shown in FIG. 13.

Trunnion plane 52 contains four trunnion axes 49 divided into two sets of two adjacent perpendicular axes which intersect at a vertex. One vertex is labeled V1 and the other V2. These vertices are the same as that labeled 50 in FIG. 11. They are labeled here as V1 and V2 and also in FIGS. 14, 18, 19, 20 for better understanding of their interrelated movement.

Bisector plane 53 (see also FIG. 11) contains the second axis of rotation 41 (see also FIG. 10) and intersects the trunnion plane 52 at right angles to form a line of intersection C. This line C is to be considered rigidly connected to axis 41. It bisects the two ninety degree vertex angles of the trunnion axes 49. Vertex V1 and vertex V2 are considered to be free to move radially toward or away from the second axis of rotation 41, as indicated by the dotted lines, but only along line C which continually bisects the two vertex angles.

FIG. 15 is an orthographic projection in the direction of arrow 105 showing disc 103 and points E, F, G, H. The start position is indicated by arrow 106 and angle B.

Figure 18:
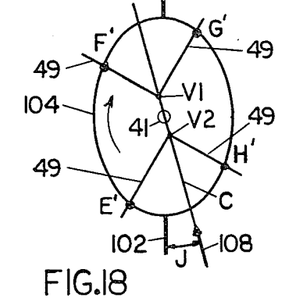
FIGS. 18, 19, 20 are orthographic projections in the direction of arrow 107 shown in FIG. 14 showing the resultant rotations of axis 41.

FIG. 18 is an orthographic projection in the direction of arrow 107 showing the intersection points E', F', G', H' that correspond with the points E, F, G, H in FIG. 15. They lie in the trunnion plane 52 and on the ellipse 104. The "stick" figure shown in FIG. 21, consisting of the four axes 49 and the line C, is superimposed upon the ellipse so that axes 49 pass through points E', F', G', H' and line C passes through point 41. Line C then assumes the angle J to line 102 (FIG. 14). Angle J and arrow 108 mark the start position for axis 41.

FIG. 16 shows axis 34 rotated 60 degrees clockwise from start position. Corresponding FIG. 19 shows line C to have rotated 60 degrees from its start position.

FIG. 17 shows axis 34 rotated 135 degrees clockwise from start position. Corresponding FIG. 20 shows line C to have rotated 135 degrees from its start position.

Figures 19, 20:
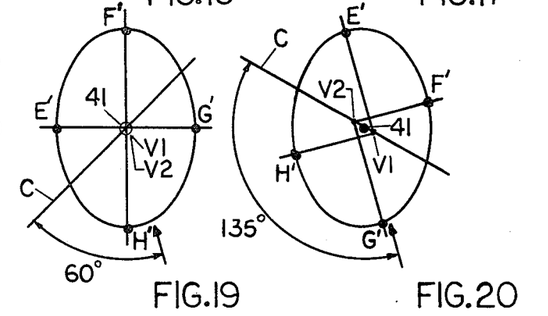

Note in FIGS. 18, 19, 20 the radial movement of the vertices V1 and V2 along line C. In a 180 degree revolution of the axes, vertex V1 will, say, start at the center of axis 41, move away radially to a maximum D distance (FIG. 21), then move back toward center and past it to the other maximum D distance and then back to center. Vertex V2 will at the same time move similarly in mirror-image synchronism with vertex V1. Also note that the trunnion axes 49 always maintain their mutual perpendicularity during all phases of vertex movement.

In view of the above, and since line C is rigidly connected to the second axis of rotation 41, it can be stated that any rotational movement of the first joint half axis of rotation 34 results in an exactly equal rotational movement of the second joint half axis of rotation 41. This homokinetic relationship between the axes of rotation can be further verified by rigorous mathematical analysis. An equation relating angles A and B, radius R and radial movement D of the trunnion vertices is given under COMMENTS.

The function of connector pin 60 (FIG. 4) used in Embodiment A and the two connector pins 85 (FIG. 3) used in Embodiment B will now be explained.

No pin is necessary in Embodiment C because external means support the two axes of rotation axially and radially and constrains them to intersect at a common fixed point P as is schematically shown in FIG. 14. Vertices V1 and V2 are thus forced to move radially in mirror-image fashion. This satisfies kinematic requirements 3 and 4 listed under DISCLOSURE OF INVENTION. Since the remaining requirements are satisfied by the rest of the structure, the result is an operable homokinetic joint.

Embodiments A and B do not have external support means so some other way to satisfy kinematic requirements 3 and 4 is required to make an operable joint. This is done by linking the two pivoting trunnion carriers together with connector pin 60 (or pins 85). The vertices V1 and V2 are thus forced to move in accordance with requirements 3 and 4. The remaining requirements are met by the rest of the structure. The result is an operable self-supporting joint.

COMMENTS

The following are additional facts that contribute to a fuller understanding of the invention:

1. The equation relating angle of inclination A, angle of rotation B, groove radial offset R and vertex movement D is:

$$D \times \cos 45° = R \times \sin B \times \cos B \times [(1/\cos A) - 1]$$

2. D is maximum when B is a multiple of 45 degrees.
3. In one complete revolution of the axes, a trunnion vertex V1 or V2 will move in the bisector plane a total linear distance equal to 8D.
4. Assuming the design proportions shown in FIG. 1 L.H. end where R=1 inch, L=2.5 inch and assuming A max.=25 degrees, B=45 degrees, then D=0.073 max. and the maximum angle through which the trunnion carriers pivot is 1.67 degrees either side of center position.
5. Centrifugal force acting on the trunnion carriers preloads the rollers, nullifying the necessary clearance between roller and groove and eliminating "slap" due to torque fluctuations. The amount of centrifugal force tolerable for any application can be varied by trunnion carrier design.
6. For convenience, the first joint half is described as being connected to a power source. It is obvious that either joint half can be the driver.

The foregoing description has been very specific to best exemplify the essence of the invention. Other embodiments are possible using the disclosed principles.

Accordingly, the scope of this invention should not be determined by the embodiments, but by the appended claims and their legal equivalents.

What is claimed is:

1. A homokinetic universal joint comprising:
   a first joint half, having a first axis of rotation;
   four axially extending grooves formed in said first joint half;
   a second joint half, having a second axis of rotation;
   four radially extending, mutually perpendicular trunnions;
   four rollers mounted on said trunnions for rotation and axial movement thereon, said rollers at the same time contained in said axially extending grooves for rolling and oscillatory movement therein; and
   means joining the trunnions to said second joint half in a torque transmitting relationship, said means constraining the trunnions to move relative to each other and the said second axis of rotation while maintaining their mutual perpendicularity, when the joint rotates with said first axis of rotation angularly disposed to the second axis of rotation.

2. A homokinetic universal joint comprising:
   a first joint half, having a first axis of rotation;
   four axially extending grooves formed in said first joint half;
   a second joint half, having a second axis of rotation;
   four radially extending, mutually perpendicular trunnions; each trunnion defining a straight line axis, said straight line axes lying in and defining a trunnion plane; any two adjacent axes intersecting at a point, forming a first vertex and a first vertex angle; the remaining two adjacent axes forming a second vertex and a second vertex angle;
   four rollers mounted on said trunnions for rotation and axial movement thereon; said rollers at the same time contained in said axially extending grooves for rolling and oscillatory movement therein; and
   first means joining the trunnions to said second joint half to make a torque transmitting connection; said first means constraining said second axis of rotation to remain perpendicular to said trunnion plane, and to lie in a bisector plane that bisects said first vertex angle and said second vertex angle; said bisector plane being perpendicular to the trunnion plane; the first means also constraining said first vertex and said second vertex to move radially toward and away from the second axis of rotation with both vertices confined to the bisector plane, when the joint is rotated with the two axes of rotation angularly disposed.

3. The homokinetic universal joint of claim 2 further comprising:
   second means to restrict said first axis of rotation and the second axis of rotation to a common fixed point of articulation lying in both axes of rotation.

4. The homokinetic universal joint of claim 2 in which:
   said first means restricts the radial movement of the first vertex and the radial movement of the second vertex to equal, synchronous, mirror-image movements toward and away from the second axis of rotation.

5. The homokinetic universal joint of claim 4 further comprising:
   restraining means to axially fix said first joint half and the second joint half while allowing angular movement between them about a common fixed point in the first axis of rotation and in the second axis of rotation.

6. A homokinetic universal joint comprising:
   a first joint half in the general shape of a hollow cylinder having an inner surface and a first axis of rotation;
   four axially extending grooves formed in said inner surface, each groove having a circular cross-section and defining an axially extending centerline path parallel to said first axis of rotation, said grooves being equally spaced circumferentially and radially;
   a second joint half having a second axis of rotation and terminating in a forked end having two parallel bearing supports symmetrically located about said second axis of rotation and having two bearing holes formed therein; each said bearing hole extending in line through both said bearing supports, and defining a bearing axis of rotation; said bearing axes of rotation being parallel to each other, lying in a common plane and symmetrically located about the second axis of rotation, the second axis of rotation being perpendicular to said common plane;

two trunnion carriers, each said trunnion carrier comprising a set of two radially extending trunnions perpendicular to each other; each said trunnion defining a straight line axis, the two said straight line axes lying in a trunnion plane and intersecting at a point forming a trunnion vertex and a trunnion vertex angle; said trunnion vertex angle being bisected by a bisector plane that is perpendicular to said trunnion plane; a boss with parallel sides spaced a distance away from the trunnion plane, said parallel sides being symmetrically located about said bisector plane and parallel therewith, said boss having a pivot shaft hole formed therein, said pivot shaft hole defining a pivot axis of rotation perpendicular to the bisector plane;

two pivot shafts fitting into the pivot shaft holes; each trunnion carrier being pivotally engaged with said second joint half by means of said pivot shafts and the second joint half bearing holes, the trunnion carriers being in an opposed relation such that the trunnion straight line axes form a cross; each trunnion carrier constrained by the said forked end of the second joint half to little or no movement in the axial direction of the bearing hole; whereby the second joint half axis of rotation lies in the bisector plane of each trunnion carrier, and that each trunnion vertex can move radially toward and away from the second axis of rotation; and four rollers, each having an outer spherical surface and an inner cylindrical bore; said rollers mounted on the trunnions for rotational and axial movement thereon; the said outer spherical surface of each roller engaging said circular cross section of an axially extending groove for oscillatory and axial movement therein.

7. The homokinetic universal joint of claim 6 further comprising:
axial fixing means to constrain the first axis of rotation and the second axis of rotation to articulate about a common fixed point lying in both axes of rotation.

8. The homokinetic universal joint of claim 6 further comprising:
connector means linking the two trunnion carriers for simultaneous pivoting movements about the bearing axes of rotation; each said pivoting movement being equal and opposite to the other, whereby said trunnion vertices move toward and away from the second axis of rotation in mirror-image synchronism.

9. The homokinetic universal joint of claim 8 in which:
said connector means comprises a cylindrical member located between and engaging both trunnion carriers.

10. The homokinetic universal joint of claim 8 further comprising:
a concave spherical surface formed in said first joint half inner surface;
a convex spherical hollow shell, said shell having an inside surface partially enclosing the trunnion carriers but accommodating the maximum pivotal movements thereof; the shell being cut away in four places to clear the rollers, said convex spherical shell engaged with said first joint half concave spherical surface for articulation therewith; and
a bolt-like member connecting the second joint half with the spherical shell, whereby said first and second joint halves are axially fixed but free to articulate about a point in the first and second axes of rotation.

* * * * *